United States Patent
Smith et al.

(10) Patent No.: US 7,136,854 B2
(45) Date of Patent: Nov. 14, 2006

(54) METHODS AND APPARATUS FOR PROVIDING SEARCH RESULTS IN RESPONSE TO AN AMBIGUOUS SEARCH QUERY

(75) Inventors: Benjamin Thomas Smith, Mountain View, CA (US); Sergey Brin, Palo Alto, CA (US); Sanjay Ghemawat, Mountain View, CA (US); John Abraham Bauer, Mountain View, CA (US)

(73) Assignee: Google, Inc., Mountainview, CA (US)

( * ) Notice: Subject to any disclaimer, the term of this patent is extended or adjusted under 35 U.S.C. 154(b) by 47 days.

(21) Appl. No.: 09/748,431

(22) Filed: Dec. 26, 2000

(65) Prior Publication Data

US 2002/0133481 A1 Sep. 19, 2002

Related U.S. Application Data

(60) Provisional application No. 60/216,530, filed on Jul. 6, 2000.

(51) Int. Cl.
*G06F 17/30* (2006.01)
*G06F 15/16* (2006.01)

(52) U.S. Cl. ............... 707/6; 707/3; 707/4; 707/104.1; 715/810

(58) Field of Classification Search ............... 707/3, 707/6, 10, 104.1, 2, 4; 704/257; 345/864; 715/810

See application file for complete search history.

(56) References Cited

U.S. PATENT DOCUMENTS

| | | | | |
|---|---|---|---|---|
| 6,226,635 | B1 * | 5/2001 | Katariya | 707/4 |
| 6,256,630 | B1 * | 7/2001 | Gilai et al. | 707/6 |
| 6,307,549 | B1 * | 10/2001 | King et al. | 715/810 |
| 6,453,315 | B1 * | 9/2002 | Weissman et al. | 707/4 |
| 2002/0021311 | A1 * | 2/2002 | Shechter et al. | 345/864 |
| 2002/0038308 | A1 * | 3/2002 | Cappi | 707/104.1 |
| 2002/0059069 | A1 * | 5/2002 | Hsu et al. | 704/257 |
| 2002/0087514 | A1 * | 7/2002 | Payne et al. | 707/1 |

* cited by examiner

*Primary Examiner*—Jeffrey Gaffin
*Assistant Examiner*—Hassan Mahmoudi
(74) *Attorney, Agent, or Firm*—Straub & Pokotylo; John C. Pokotylo (57) ABSTRACT

Methods and apparatus consistent with the invention allow a user to submit an ambiguous search query and to receive relevant search results. In one embodiment, a sequence of numbers received from a user of a standard telephone keypad is translated into a set of potentially corresponding alphanumeric sequences. These potentially corresponding alphanumeric sequences are provided as an input to a conventional search engine, using a boolean "OR" expression, and the search results are presented to the user. The search engine effectively limits search results to those in which the user was likely interested.

27 Claims, 9 Drawing Sheets

| TERM | LOCATION (DOCUMENT) |
|---|---|
| 3 | DOCUMENT 1 |
| BAR | DOCUMENT 3 |
| CAR | DOCUMENT 1 |
| CHAMPAGNE | DOCUMENT 3 |
| ITEMS | DOCUMENT 3 |
| RENTAL | DOCUMENTS 1 AND 2 |
| REPAIR | DOCUMENT 1 |
| VIDEO | DOCUMENT 2 |
| WINE | DOCUMENT 3 |

| TERM | LOCATION (DOCUMENT) |
|---|---|
| 3 | DOCUMENT 1 |
| 227 | DOCUMENTS 1 AND 3 |
| 242672463 | DOCUMENT 3 |
| 48367 | DOCUMENT 3 |
| 736825 | DOCUMENTS 1 AND 2 |
| 737247 | DOCUMENTS 1 |
| 84336 | DOCUMENT 2 |
| 8463 | DOCUMENT 3 |

METHODS AND APPARATUS FOR PROVIDING SEARCH RESULTS IN RESPONSE TO AN AMBIGUOUS SEARCH QUERY

RELATED APPLICATION

This application claims priority under 35 U.S.C. § 119(e) based on U.S. Provisional Application Ser. No. 60/216,530, entitled DATA ENTRY AND SEARCH FOR HANDHELD DEVICES, filed on Jul. 6, 2000, the disclosure of which is herein incorporated by reference in its entirety.

BACKGROUND OF THE INVENTION

A. Field of the Invention

This invention relates generally to methods and apparatus for providing search results in response to an ambiguous search query provided by a user.

B. Description of the Related Art

Most search engines operate under the assumption that the end user is entering search queries using something like a conventional keyboard, where the input of alphanumeric strings is not difficult. As small devices become more common, however, this assumption is not always valid. For example, users may query search engines using a wireless telephone that supports the WAP (Wireless Application Protocol) standard. Devices such as wireless telephones typically have a data input interface wherein a particular action by the user (e.g., pressing a key) may correspond to more than one alphanumeric character. A detailed description of WAP architecture is available at http://www1.wapforum.org/tech/documents/SPEC-WAPArch-19980439.pdf ("WAP 100 Wireless Application Protocol Architecture Specification").

In the usual case, the WAP user navigates to the search query page, and is presented with a form into which they input their search query. With conventional methods, the user may be required to press multiple keys to select a particular letter. On a standard telephone keypad, for example, the user would select the letter "b" by pressing the "2" key twice, or would select the letter "s" by pressing the "7" key four times. Accordingly, to enter a query for "ben smith", the user would ordinarily need to enter the following string of keypress: 2233660777764444844, which map to letters as follows:

22->b
33->e
66->n
0->space
7777->s
6->m
444->i
8->t
44->h

After the user has entered their search request, the search engine receives the word or words from the user, and proceeds in much the same manner as if it had received the request from a desktop browser wherein the user employed a conventional keyboard.

As can be seen from the foregoing example, this form of data entry is inefficient in that it requires eighteen keystrokes to enter the nine alphanumeric characters (including the space) corresponding to "ben smith". Others have attempted to overcome the limitations imposed by reduced data entry devices, but each of the approaches developed thus far has shortcomings. There remains, therefore, a need for methods and apparatus for providing relevant search results in response to an ambiguous search query.

SUMMARY OF THE INVENTION

Methods and apparatus consistent with the present invention, as embodied and broadly described herein, provide relevant search results in response to an ambiguous search query. Consistent with the invention, such a method includes receiving a sequence of ambiguous information components from a user. The method obtains mapping information that maps the ambiguous information components to less ambiguous information components. This mapping information is used to translate the sequence of ambiguous information components into one or more corresponding sequences of less ambiguous information components. One or more of these sequences of less ambiguous information are provided as an input to a search engine. The search results are obtained from the search engine and are presented to the user.

BRIEF DESCRIPTION OF THE DRAWINGS

The accompanying drawings, which are incorporated in, and constitute a part of, this specification illustrate an embodiment of the invention and, together with the description, serve to explain the advantages and principles of the invention. In the drawings.

DETAILED DESCRIPTION

Reference will now be made in detail to an embodiment of the present invention as illustrated in the accompanying drawings. The same reference numbers may be used throughout the drawings and the following description to refer to the same or like parts.

A. Overview

Methods and apparatus consistent with the invention allow a user to submit an ambiguous search query and to receive potentially disambiguated search results. In one embodiment, a sequence of numbers received from a user of a standard telephone keypad is translated into a set of potentially corresponding alphanumeric sequences. These potentially corresponding alphanumeric sequences are provided as an input to a conventional search engine, using a boolean "OR" expression. In this manner, the search engine is used to help limit search results to those in which the user was likely interested.

B. Architecture

Figure 1:
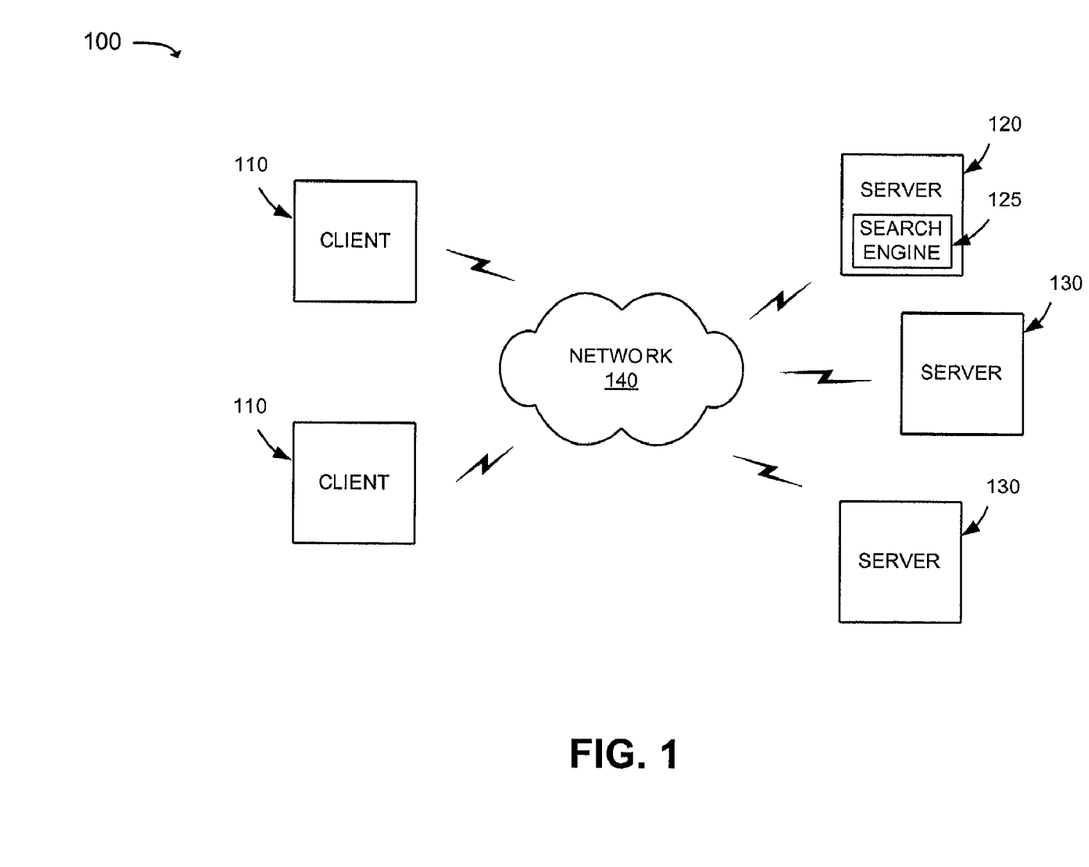
FIG. 1 illustrates a block diagram of a system in which methods and apparatus consistent with the present invention map be implemented.

FIG. 1 illustrates a system 100 in which methods and apparatus, consistent with the present invention, may be implemented. The system 100 may include multiple client devices 110 connected to multiple servers 120 and 130 via a network 140. The network 140 may include a local area network (LAN), a wide area network (WAN), a telephone network, such as the Public Switched Telephone Network (PSTN), an intranet, the Internet, or a combination of networks. Two client devices 110 and three servers 120 and 130 have been illustrated as connected to network 140 for simplicity. In practice, there may be more or less client devices and servers. Also, in some instances, a client device may perform the functions of a server and a server may perform the functions of a client device.

The client devices 110 may include devices, such as mainframes, minicomputers, personal computers, laptops, personal digital assistants, or the like, capable of connecting to the network 140. The client devices 110 may transmit data over the network 140 or receive data from the network 140 via a wired, wireless, or optical connection.

Figure 2:
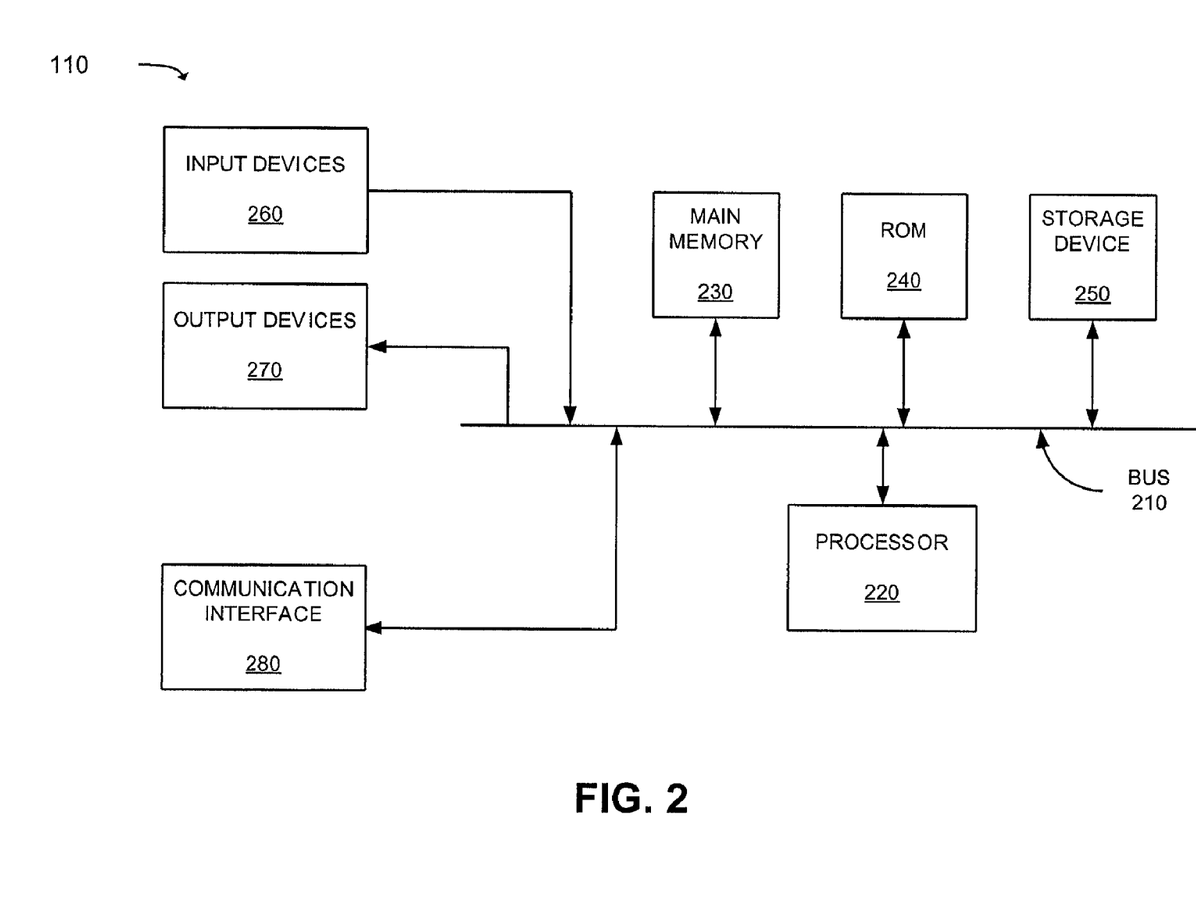
FIG. 2 illustrates a block diagram of a client device, consistent with the invention.

FIG. 2 illustrates an exemplary client device 110 consistent with the present invention. The client device 110 may include a bus 210, a processor 220, a main memory 230, a read only memory (ROM) 240, a storage device 250, an input device 260, an output device 270, and a communication interface 280.

The bus 210 may include one or more conventional buses that permit communication among the components of the client device 110. The processor 220 may include any type of conventional processor or microprocessor that interprets and executes instructions. The main memory 230 may include a random access memory (RAM) or another type of dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input device 260 may include one or more conventional mechanisms that permit a user to input information to the client device 110, such as a keyboard, a mouse, a pen, voice recognition and/or biometric mechanisms, etc. The output device 270 may include one or more conventional mechanisms that output information to the user, including a display, a printer, a speaker, etc. The communication interface 280 may include any transceiver-like mechanism that enables the client device 110 to communicate with other devices and/or systems. For example, the communication interface 280 may include mechanisms for communicating with another device or system via a network, such as network 140.

As will be described in detail below, the client devices 110, consistent with the present invention, perform certain searching-related operations. The client devices 110 may perform these operations in response to processor 220 executing software instructions contained in a computer-readable medium, such as memory 230. A computer-readable medium may be defined as one or more memory devices and/or carrier waves. The software instructions may be read into memory 230 from another computer-readable medium, such as the data storage device 250, or from another device via the communication interface 280. The software instructions contained in memory 230 causes processor 220 to perform search-related activities described below. Alternatively, hardwired circuitry may be used in place of or in combination with software instructions to implement processes consistent with the present invention. Thus, the present invention is not limited to any specific combination of hardware circuitry and software.

The servers 120 and 130 may include one or more types of computer systems, such as a mainframe, minicomputer, or personal computer, capable of connecting to the network 140 to enable servers 120 and 130 to communicate with the client devices 110. In alternative implementations, the servers 120 and 130 may include mechanisms for directly connecting to one or more client devices 110. The servers 120 and 130 may transmit data over network 140 or receive data from the network 140 via a wired, wireless, or optical connection.

The servers may be configured in a manner similar to that described above in reference to FIG. 2 for client device 110. In an implementation consistent with the present invention, the server 120 may include a search engine 125 usable by the client devices 110. The servers 130 may store documents (or web pages) accessible by the client devices 110.

C. Architectural Operation

Figure 3:
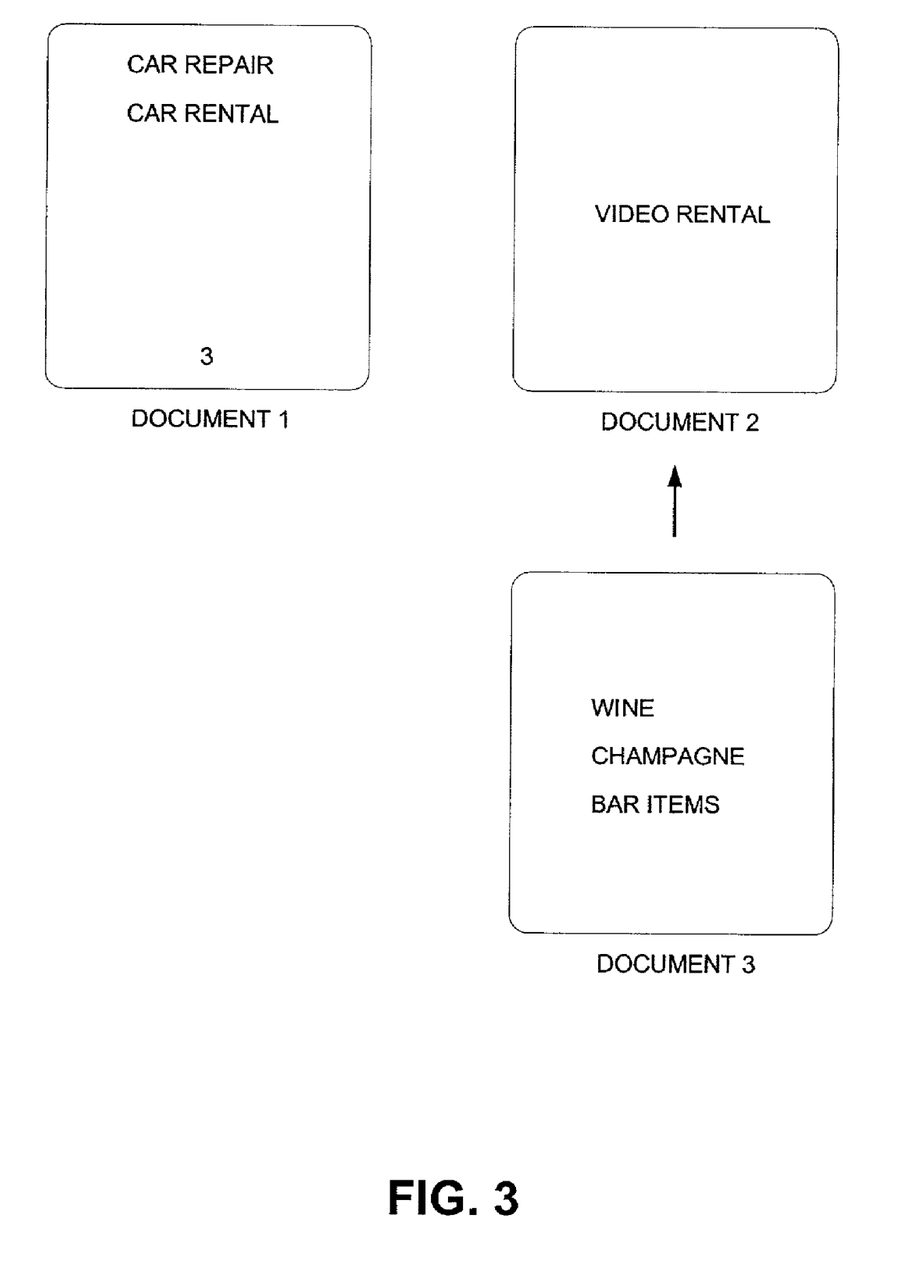
FIG. 3 illustrates a diagram depicting three documents.

FIG. 3 illustrates a diagram depicting three documents, which may be stored for example on one of the servers 130.

A first document (Document 1) contains two entries—"car repair" and "car rental"—and is numbered "3" at its bottom. A second document (Document 2) contains the entry "video rental". A third document (Document 3) contains three entries—"wine", "champagne", and "bar items"—and includes a link (or reference) to Document 2.

For the sake of illustrative simplicity, the documents shown in FIG. 3 only contain alphanumeric strings of information (e.g., "car", "repair", "wine", etc.). Those skilled in the art will recognize, however, that in other situations the documents could contain other types of information, such as phonetic, or audiovisual information.

Figure 4A:
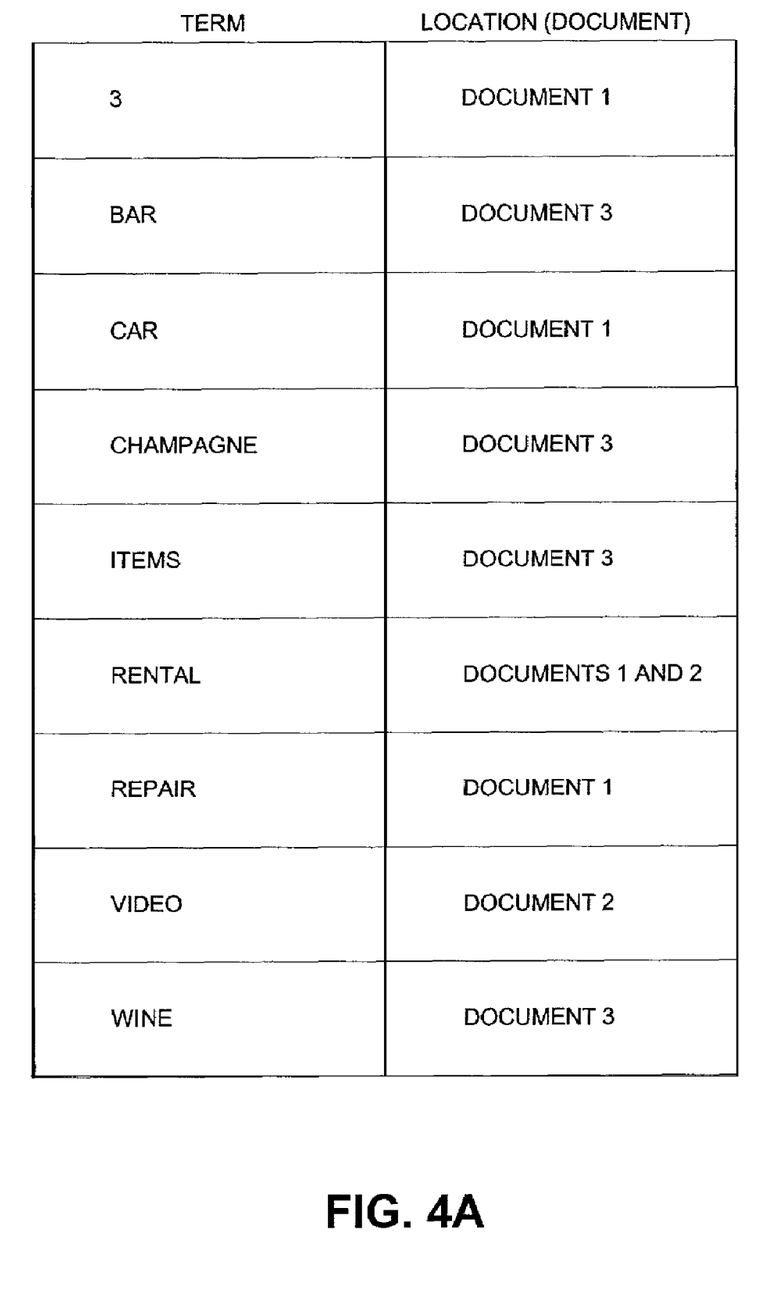
FIG. 4a illustrates a conventional alphanumeric index.

FIG. 4a illustrates a conventional alphanumeric index, based on the documents shown in FIG. 3. The first column of the index contains a list of alphanumeric terms, and the second column contains a list of the documents corresponding to those terms. Some terms, such as the alphanumeric term "3", only correspond to (e.g., appear in) one document—in this case Document 1. Other terms, such as "rental", correspond to multiple documents—in this case Documents 1 and 2.

Figure 4B:
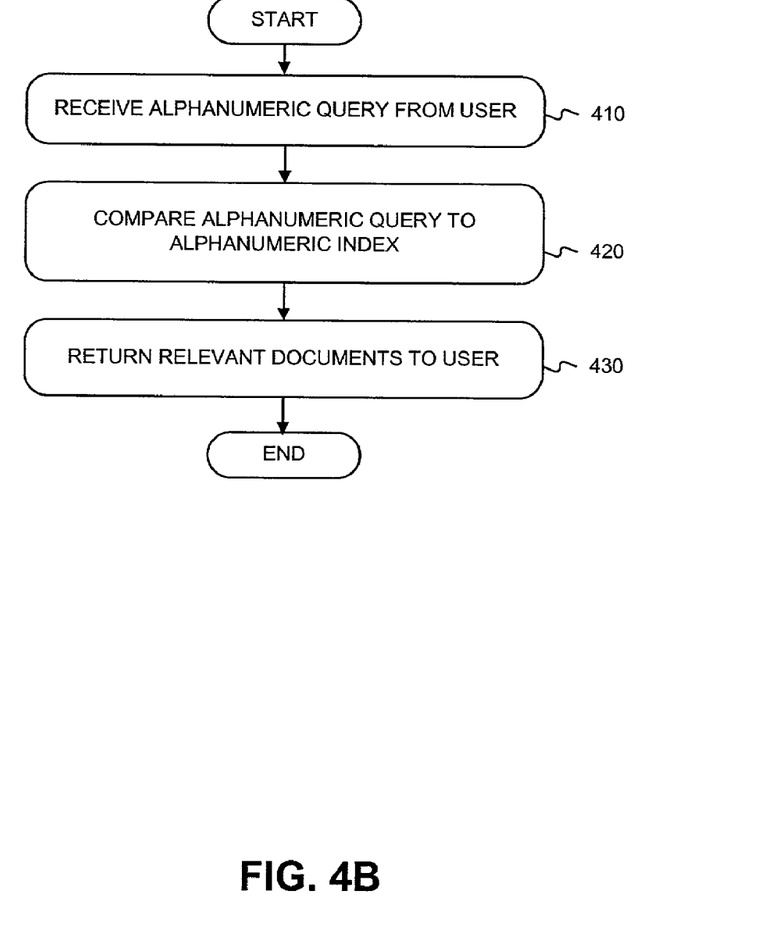
FIG. 4b illustrates a flow diagram for providing search results in response to a conventional alphanumeric search query.

FIG. 4b illustrates how a conventional search engine, such as search engine 125, would use the index illustrated in FIG. 4a to provide search results in response to an alphanumeric search query. The alphanumeric query may be generated using any conventional technique. For purposes of illustration, consider two alphanumeric queries: "car" and "wine". Under a conventional approach, search engine 125 receives an alphanumeric query, such as a "car" (stage 410), and uses the alphanumeric index to determine which documents correspond to that query. (stage 420). In this example, a conventional search engine 125 would use the index illustrated in FIG. 4a to determine that "car" corresponds to Document 1 and would return Document 1 (or a reference to it) to the user as a search result. Similarly, a conventional search engine would determine that "wine" corresponds to Document 3 and would return Document 3 (or a reference to it) to the user (stage 430)

Figure 5A:
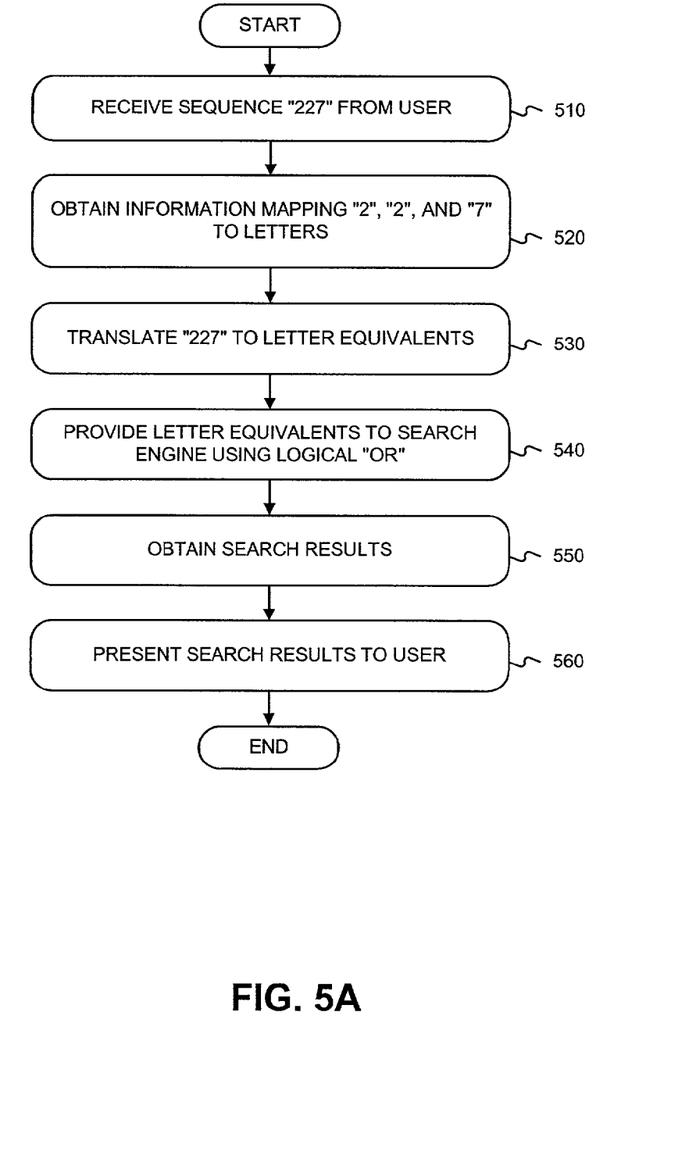
FIG. 5a illustrates a flow diagram, consistent with the invention, for providing search results in response to an ambiguous search query.

FIG. 5a illustrates a flow diagram, consistent with the invention, of a preferred technique for providing search results in response to a numeric search query, based on the documents and index shown in FIGS. 3 and 4a, respectively. For the sake of illustrative ease, FIG. 5a describes a particular technique for processing a numeric query based on the mapping of a standard telephone handset; but those skilled in the art will recognize that other techniques consistent with the invention may be used.

Figure 5B:
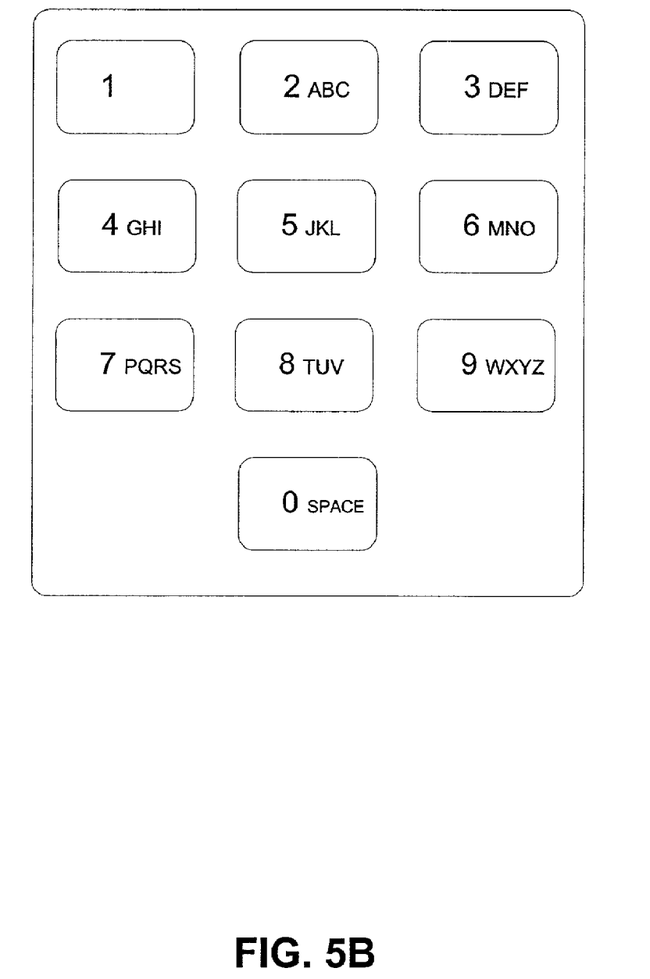
FIG. 5b illustrates a diagram for mapping alphanumeric information to numeric information.
Figure 5C:
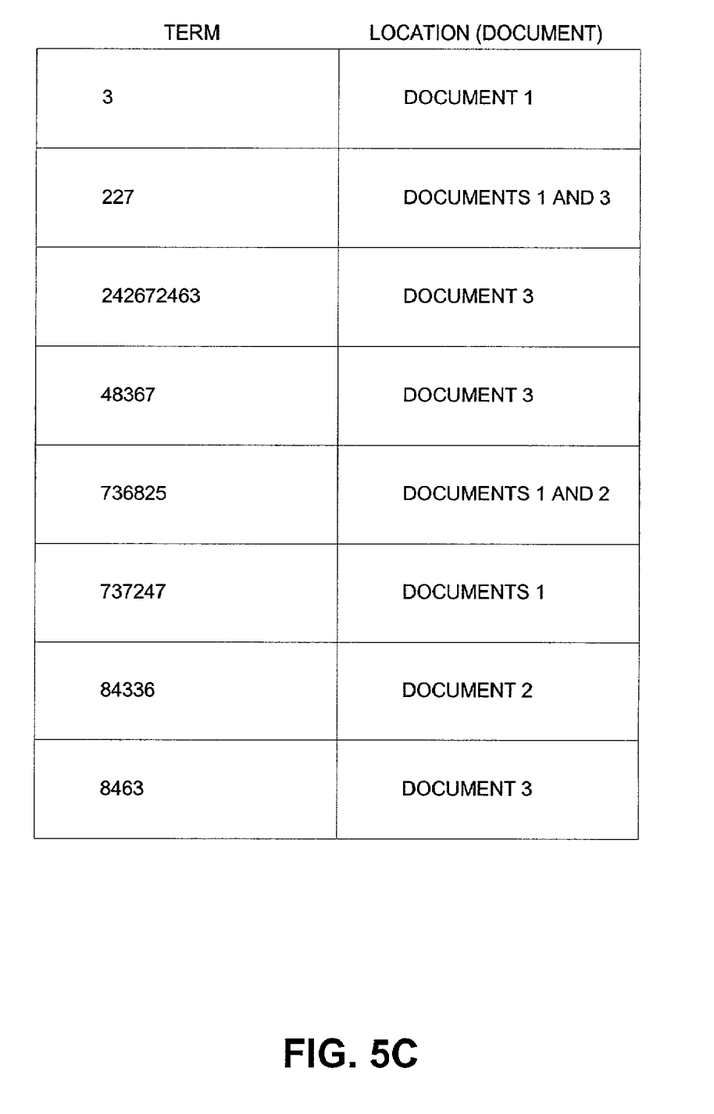
FIG. 5c illustrates a numeric index.

At stage 510, a sequence "227" (consisting of numeric components "2", "2", and "7") is received from a user. At stage 520, information is obtained about how the numeric components map to letters. Assuming that the user entered the information from a standard telephone keypad, this mapping information is shown in FIG. 5b. As shown in FIG. 5b, the letters "a", "b", and "c" each map to the number "1", the letters "p", "q", "r", and "s" each map to the number "7", and so forth.

At stage 530, using this mapping information, the sequence "227" is translated into its potential alphanumeric equivalents. Based on the information shown in FIG. 5b, there exist 36 possible combinations of letters that correspond to the sequence "227", including the following: aap, bap, cap, abp, bbp, . . . bar . . . car . . . ccs. If numbers are included in the possible combinations (e.g., "aa7"), there would exist 80 possible combinations. Rather than generating all possible alphanumeric equivalents, it may be desirable to limit the generated equivalents based on some lexicon. For example, it may be desirable to generate only those alphanumeric equivalents that appear in a dictionary, search engine log of previous search queries, etc.; or to otherwise limit the alphanumeric equivalents by using known statistical techniques (e.g., the probability of certain words appearing together).

At stage 540, these alphanumeric equivalents are provided as an input to a conventional search engine, such as that described in reference to FIGS. 4a and 4b, using a logical "OR" operation. For example, the search query provided to the search engine could be "aap OR bap OR cap OR abp . . . OR bar . . . OR car". Although all possible alphanumeric equivalents may be provided to the search engine, a subset may instead be used by using conventional techniques to eliminate equivalents that are unlikely to be intended. For example, one could generate a narrower list of possible combinations by using techniques that draw upon probabilistic information about the usage of letters or words: one could ignore combinations that begin with "qt" but include (and favor) combinations that begin with "qu."

At stage 550, search results are obtained from the search engine. Because terms such as "aap" and "abp" do not appear in the search engine's index, they are effectively ignored. Indeed, the only terms contained within the index shown in FIG. 4b are "car" and "bar", and so the only search results returned are those that reference Documents 1 and 3. At stage 560, these search results are presented to the user. The search results may be presented in the same order provided by the search engine, or may be reordered based on considerations such as the language of the user. Assuming that the user was only interested in documents containing the term "bar", the user would receive an undesired result (Document 3) in addition to the desired result (Document 1). This may be an acceptable price to pay, however, for the benefit of the user only having to press three keys to formulate the search query.

Figure 6:
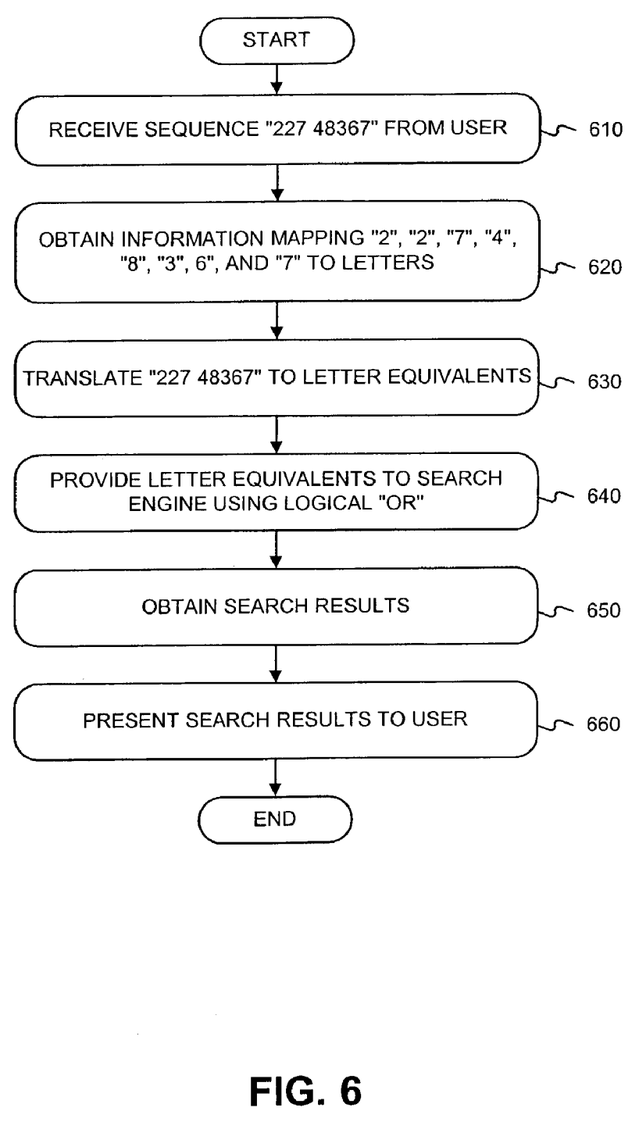
FIG. 6 illustrates another flow diagram, consistent with the invention, for providing search results in response to an ambiguous search query.

FIG. 6 illustrates another flow diagram, consistent with the invention, of a preferred technique for providing search results in response to a numeric search query, based on the documents and index shown in FIGS. 3 and 4a, respectively. This flow diagram demonstrates how increasing the size of the received sequence can help limit search results to those desired by the user. For the sake of illustrative ease, FIG. 6 again describes a particular technique for processing a numeric query based on the mapping of a standard telephone handset; but those skilled in the art will recognize that other techniques consistent with the invention may be used.

At stage 610, a sequence "227 48367" (consisting of numeric components "2", "2", "7", "4", "8", "3", "6", "7") is received from a user. For the sake of explanation, the sequence "227" will be called a "number word" and the entire sequence "227 48367" will be called a "number phrase." The possible alphanumeric equivalents of a number word will be called "letter words" and the possible alphanumeric equivalents of a number phrase will be called "letter phrases."

At stage 620, information is obtained about how the numeric components map to letters. Assuming the same mapping information is used as shown in FIG. 5b, at stage 630, the number phrase "227 48367" is translated into potentially corresponding letter phrases. Based on the information shown in FIG. 5b, there exist 11664 possible letter phrases that correspond to the sequence "227 48367".

At stage 640, these letter phrases are provided as an input to a conventional search engine, such as that described in reference to FIGS. 4a and 4b, using a logical "OR" operation. For example, the search query provided to the search engine could be "'aap gtdmp' OR 'aap htdmp' . . . OR 'bar items' . . . OR 'car items'". Although all possible letter phrases may be provided to the search engine, a subset may instead be used by employing conventional techniques to eliminate letter phrases that are unlikely to be intended.

At stage 650, search results are obtained from the search engine. Because many search engines are designed to rank highly those documents that contain the exact phrase sought, Document 3 would likely be the highest ranked search result (i.e., because it contains the exact phrase "bar items"). No other document in the example contains one of the other letter phrases generated at stage 620. Furthermore, many search engines downweight (or eliminate) search results that contain individual parts of a phrase but not the entire phrase. For example, Document 1 would be downweighted or eliminated because it contains the letter word "car", which corresponds to the first part of the letter phrase, but it does not contain any letter word that corresponds to the second part of the letter phrase. Finally, letter phrases such as "aap htdmp" are effectively ignored because they contain no letter words that appear in the search engine's index.

At stage 660, the search results are presented to the user. In the example shown, the first result shown to the user would be Document 3, which is likely most relevant to the user's query. Document 1 may be eliminated altogether, because it does not contain one of the possible letter phrases. In this manner, the user is provided with the most relevant search results.

Although the descriptions above in reference to FIGS. 5 and 6 are made in reference to receiving numeric information and mapping it to alphanumeric information, those skilled in the art will recognize that other implementations are possible consistent with the invention. For example, instead of receiving a sequence of numbers corresponding to the keys pressed by a user, the received sequence may consist of the first letters corresponding to the keys pressed by the user. In other words, instead of receiving "227", the received sequence may be "aap". Consistent with the invention, the equivalents letter sequences generated in stages 530 or 630 could then be other letter sequences (e.g., "bar") that correspond to "aap." Indeed, the received sequence may contain phonetic, audiovisual, or any other type of information components.

Regardless of the form in which the sequence is received, it is generally preferred that the received sequence be translated into a sequence that corresponds to the format in which information is stored in the search engine's index. For example, if the search engine's index is stored in alphanumeric format, the received sequence should be translated into alphanumeric sequences.

Furthermore, it is generally preferred that the mapping technique that is used to translate the received sequence of information components be the same technique that is employed at the user's device to map the user's input to the information generated by the device. There may, however, be instances where it is preferable to use a different mapping technique than is used for user input.

D. Conclusion

As described in detail above, methods and apparatus consistent with the invention provide search results in response to an ambiguous search query. The foregoing description of an implementation of the invention has been presented for purposes of illustration and description. Modifications and variations are possible in light of the above teachings or may be acquired from practicing the invention.

For example, although the foregoing description is based on a client-server architecture, but those skilled in the art will recognize that a peer-to-peer architecture may be used consistent with the invention. Moreover, although the described implementation includes software, the invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM. The scope of the invention is therefore defined by the claims and their equivalents.

What is claimed is:

1. A method of providing search results in response to an ambiguous search query, the ambiguous search query including a sequence of ambiguous information components, the method comprising:
    receiving a sequence of ambiguous information components from a user;
    obtaining mapping information that maps the ambiguous information components to less ambiguous information components;
    using the mapping information and a lexicon, the lexicon comprising less ambiguous information components that have been previously processed by a search engine as search queries, to convert the sequence of ambiguous information components into at least two corresponding sequences of less ambiguous information components;
    providing the at least two sequences of less ambiguous information, each of the sequences effectively being joined by a logical "OR" operation request, as an input to the search engine;
    obtaining search results from the search engine; and
    presenting the search results to the user.

2. The method of claim 1, wherein the mapping information is based on the configuration of a standard telephone keypad.

3. The method of claim 1, wherein the ambiguous information components comprise numbers and the less ambiguous information components comprise letters.

4. The method of claim 1, wherein each of the ambiguous information components comprise a single press of a key and the less ambiguous information comprises letters that correspond to the key.

5. The method of claim 1, wherein the ambiguous information components comprise phonemes.

6. The method of claim 5, wherein the less ambiguous information components comprise alphanumeric information.

7. The method of claim 1, wherein the ambiguous information components comprise visual information.

8. The method of claim 1, wherein the act of using further comprises using a dictionary to help convert the sequence of ambiguous information components into one or more corresponding sequences of less ambiguous information components.

9. The method of claim 1 wherein the act of using the mapping information and the lexicon to convert the sequence of ambiguous information components into one or more corresponding sequences of less ambiguous information components includes using the mapping information to directly translate the sequence of ambiguous information components into one or more corresponding sequences of less ambiguous information components.

10. The method of claim 1 wherein the ambiguous information components are more ambiguous than the less ambiguous information components due to a limited capability of a user input device.

11. The method of claim 1 further comprising looking up search results using an index including entries, at least one entry including a sequence of less ambiguous information components mapped to a set of one or more items.

12. A method of providing search results to a user in response to an ambiguous search query, comprising:
    receiving at least two number words constituting a number phrase;
    converting each number word into one or more letter words, based on mapping information, in combination with a lexicon, to generate a plurality of letter phrases, each of the letter phrases corresponding to the number phrase, wherein the lexicon is a list of letter phrases that previously have been processed by the search engine as search queries;
    forming a search query to a search engine wherein the search query includes at least one of the letter phrases;
    obtaining search results from the search engine in response to the search query; and
    providing the search results to a user,
    wherein the search results include references to Web page documents.

13. The method of claim 12, wherein the providing step comprises providing at least two of the letter phrases, each of the letter phrases being effectively joined by a logical "OR" operation request, as a search query to a search engine.

14. The method of claim 12, wherein the mapping information is based on a standard telephone keypad.

15. The method of claim 12 wherein the search results provided to the user have been ranked such that search results corresponding to documents that include an exact match of at least one of the letter phrases are provided higher than search results corresponding to documents that do not include an exact match of any of the letter phrases.

16. The method of claim 12 wherein the search results exclude search results corresponding to documents that do not include an exact match of any of the letter phrases.

17. A method of providing search results in response to an ambiguous search query, the ambiguous search query including a sequence of ambiguous information components, the method comprising:
receiving a sequence of ambiguous information components from a user;
obtaining mapping information that maps the ambiguous information components to less ambiguous information components;
using the mapping information to translate the sequence of ambiguous information components into a plurality of corresponding sequences of less ambiguous information components;
determining a subset of the plurality of sequences of less ambiguous information components by comparing the plurality of sequences of less ambiguous information components with terms used in past search queries, stored in a search query log, that previously have been processed by the search engine;
providing the subset of sequences of less ambiguous information components as an input to a search engine;
obtaining search results from the search engine; and
presenting the search results to the user.

18. The method of claim 17, wherein the act of determining comprises using statistical information about the co-occurrence of the less ambiguous information components within the sequence.

19. A method of providing search results in response to an ambiguous search query, comprising:
receiving a sequence of information components from a user, each information component corresponding to a key press;
obtaining mapping information that maps each of the key press information components to a plurality of other information components, each corresponding to the same key press;
using the mapping information, in combination with a lexicon, to determine, from the sequence of key press information components, other sequences of information components by converting each key press information component to each of the other information components that correspond to the key press component, wherein the lexicon is a list of other sequences of information components that previously have been processed by a search engine as search queries;
providing one or more of the received sequence and the other sequences as a search query input to the a search engine;
obtaining search results from the search engine; and
presenting the search results to the user,
wherein the search results include references to Web page documents.

20. The method of claim 19, wherein the mapping information is based on the configuration of a standard telephone keypad.

21. The method of claim 20, wherein the received information components comprise numbers and the other information components comprise letters.

22. The method of claim 20, wherein both the received and other information components comprise letters.

23. The method of claim 19, wherein the act of providing comprises providing at least two sequences to the search engine using a logical "OR"operations.

24. A method of providing search results in response to an ambiguous search query, the ambiguous search query including a sequence of ambiguous information components, the method comprising:
receiving a sequence of ambiguous information components from a user associated with a language;
obtaining mapping information that maps the ambiguous information components to less ambiguous information components;
using the mapping information, in combination with a lexicon, to convert the sequence of ambiguous information components into one or more corresponding sequences of less ambiguous information components, wherein the lexicon is a list of sequences of less ambiguous information components that previously have been processed by a search engine as search queries;
providing one or more of the sequences of less ambiguous information as an input to a search engine;
obtaining search results from a search engine;
reordering the obtained search results using the language of the user; and
presenting the reordered search results to the user, wherein the search results include references to Web page documents.

25. A computer-readable medium consisting of one or more memory devices and/or storage devices storing one or more instructions for providing search results in response to an ambiguous search query, the ambiguous search query including a sequence of ambiguous information components, the instructions comprising:
receiving a sequence of ambiguous information components from a user;
obtaining mapping information that maps the ambiguous information components to less ambiguous information components;
using the mapping information, in combination with a lexicon, to convert translate the sequence of ambiguous information components into at least two corresponding sequences of less ambiguous information components, wherein the lexicon is a list of sequences of less ambiguous information components that previously have been processed by a search engine as search queries;
providing the at least two sequences of less ambiguous information, each of the sequences effectively being joined by a logical "OR" operation request, as an input to the a search engine;
obtaining search results from the search engine; and
presenting the search results to the user.

26. An apparatus for providing search results in response to an ambiguous search query, the ambiguous search query including a sequence of ambiguous information components, comprising:
at least one memory having program instructions; and
at least one processor configured to execute the program instructions to perform the operations of:
receiving a sequence of ambiguous information components from a user;
obtaining mapping information that maps the ambiguous information components to less ambiguous information components;
using the mapping information, in combination with a lexicon, to convert the sequence of ambiguous information components into at least two corresponding sequences of less ambiguous information components, wherein the lexicon is a list of sequences of less ambiguous information components that previously have been processed by a search engine as search queries;

providing the at least two sequences of less ambiguous information, each of the sequences effectively being joined by a logical "OR" operation request, as an input to the a search engine;

obtaining search results from the search engine; and presenting the search results to the user.

27. An apparatus for providing search results in response to an ambiguous search query, the ambiguous search query including a sequence of ambiguous information components, comprising:

means for receiving a sequence of ambiguous information components from a user;

means for obtaining mapping information that maps the ambiguous information components to less ambiguous information components;

means for using the mapping information, in combination with a lexicon, to convert the sequence of ambiguous information components into at least two corresponding sequences of less ambiguous information components, wherein the lexicon is a list of sequences of less ambiguous information components that previously have been processed by a search engine as search queries;

means for providing the at least two sequences of less ambiguous information, each of the sequences effectively being joined by a logical "OR" operation request, as an input to the a search engine;

means for obtaining search results from the search engine; and means for presenting the search results to the user.

* * * * *